(12) United States Patent
Walter et al.

(10) Patent No.: US 10,328,908 B2
(45) Date of Patent: Jun. 25, 2019

(54) PNEUMATIC FOOTPLATE CLEANING

(71) Applicant: GEBR. BODE GMBH & CO. KG, Kassel (DE)

(72) Inventors: Hans Joachim Walter, Kassel (DE); Oliver Paul, Wolfenbüttel (DE)

(73) Assignee: GEBR. BODE GMBH & CO. KG, Kassel (DE)

( * ) Notice: Subject to any disclaimer, the term of this patent is extended or adjusted under 35 U.S.C. 154(b) by 0 days.

(21) Appl. No.: 15/770,418

(22) PCT Filed: Oct. 23, 2015

(86) PCT No.: PCT/EP2015/074652
§ 371 (c)(1),
(2) Date: Apr. 23, 2018

(87) PCT Pub. No.: WO2017/067612
PCT Pub. Date: Apr. 27, 2017

(65) Prior Publication Data
US 2018/0312142 A1    Nov. 1, 2018

(51) Int. Cl.
*B60R 3/02* (2006.01)
*B60S 1/66* (2006.01)
*B61D 23/02* (2006.01)
*B60S 1/54* (2006.01)

(52) U.S. Cl.
CPC ........ *B60S 1/66* (2013.01); *B60R 3/02* (2013.01); *B61D 23/025* (2013.01); *B60S 1/54* (2013.01)

(58) Field of Classification Search
CPC .................................. B60R 3/02; B60R 3/002
USPC ................................................... 280/163, 166
See application file for complete search history.

(56) References Cited

U.S. PATENT DOCUMENTS

| 4,185,849 A * | 1/1980 | Jaeger ....... | B60R 3/02 105/445 |
| 5,342,073 A * | 8/1994 | Poole ........ | B60R 3/02 105/449 |
| 6,655,706 B1 * | 12/2003 | Murrell ..... | B60R 3/02 182/88 |
| 7,044,487 B2 * | 5/2006 | Byrne ....... | B60R 3/00 280/163 |

(Continued)

FOREIGN PATENT DOCUMENTS

| CN | 202138388 U | 2/2012 |
| DE | 8815693 U1 | 2/1989 |

(Continued)

OTHER PUBLICATIONS

International Search Report dated Jul. 22, 2016 re: Application No. PCT/EP2015/074652; pp. 1-3; citing: EP 2 022 671 A1, DE 20 2008 005490 U1, CN 202 138 388 U, DE 88 15 693 U1 and DE 199 37 487 A1.

*Primary Examiner* — Jeffrey J Restifo
(74) *Attorney, Agent, or Firm* — Cantor Colburn LLP

(57) ABSTRACT

A vehicle step system includes a footplate, having a footplate top side which can be stepped on and a cleaning device for cleaning the footplate top side, wherein the cleaning device has at least one air duct having at least one opening. The air duct can be supplied with compressed air, such that a compressed air stream can flow out of the opening. The opening is directed in the direction of the footplate top side in such a way that the compressed air stream strikes the footplate top side.

4 Claims, 4 Drawing Sheets

(56) References Cited

U.S. PATENT DOCUMENTS

| | | | | |
|---|---|---|---|---|
| 7,926,827 B2* | 4/2011 | Kircher | ..................... | B60R 3/02 |
| | | | | 280/166 |
| 7,934,736 B2* | 5/2011 | Kircher | ................. | A61G 3/061 |
| | | | | 280/164.2 |
| 7,971,891 B2* | 7/2011 | Kircher | ................. | A61G 3/061 |
| | | | | 280/163 |
| 8,016,309 B2* | 9/2011 | Flajnik | ................... | B60R 3/002 |
| | | | | 280/163 |
| 8,042,820 B1* | 10/2011 | Dewees | ................... | B60R 3/02 |
| | | | | 280/166 |
| 8,297,635 B2* | 10/2012 | Agoncillo | ................ | B60R 3/02 |
| | | | | 280/163 |
| 8,556,283 B2* | 10/2013 | Coochesfahani | .... | B61D 23/025 |
| | | | | 105/447 |
| 8,770,607 B2* | 7/2014 | Rasekhi | ............... | B61D 23/025 |
| | | | | 280/163 |
| 9,499,221 B2* | 11/2016 | Deck | ................. | B60H 1/00564 |
| 9,902,326 B2* | 2/2018 | Carr | .......................... | B60R 3/02 |
| 2009/0033058 A1* | 2/2009 | VanderGriend | .... | B60H 1/00271 |
| | | | | 280/164.1 |

FOREIGN PATENT DOCUMENTS

| | | |
|---|---|---|
| DE | 19937487 A1 | 2/2001 |
| DE | 202008005490 U1 | 4/2009 |
| EP | 2022671 A1 | 2/2009 |

* cited by examiner

PNEUMATIC FOOTPLATE CLEANING

TECHNICAL FIELD

The present disclosure refers to a vehicle step system having a cleaning device as well as a method for cleaning a footplate of a vehicle step system.

BACKGROUND

Conventional step systems which generally are equipped with a brush in the vicinity of the open gap between a footplate and a vehicle-side rail, are used in vehicles, in particular in vehicles for passenger transport, such as rail vehicles and buses. Said brush serves for cleaning the footplate and for protection against any debris entering into the vehicle inner space. One step rail is arranged on the vehicle side on a gate of the footplate of the vehicle, for example on a door gate. Said door gate is tightened by means of a brush, which however sometimes provides insufficient seal against debris or introduction of factors from the environment. When retracting the footplate, debris, such as for example split, small stones or ice and snow, are removed by the brush from the footplate only to a small extent and insufficiently and mostly accumulate again even in front of the brush and the vehicle-side step rail. When passing on a brush, then, debris shall be transported into the vehicle inner space during the retraction process of the footplate through the door gate and must be removed during maintenance work. From time to time, it also happens that debris such as winter highway gritting, split, salt, or ice and snow lead to jamming when retracting the footplate into the door gate, which might entail dysfunctions and failures of the entire transport system, in turn.

SUMMARY

Therefore, the disclosure provides an enhanced variant of a step system for vehicles enabling cleaning of a footplate from debris and foreign particles.

This will be solved by providing a vehicle step system having a vehicle step system comprising a footplate having a footplate top side which can be stepped on and a cleaning device for cleaning the footplate top side, wherein the cleaning device has at least one air duct comprising at least one opening and the air duct can be supplied with compressed air, such that a compressed air stream can flow out of the opening, and wherein the opening is directed in the direction of the footplate top side in such a way that the compressed air stream strikes the footplate top side; and a method for cleaning a footplate of a vehicle step system, wherein the method includes the step of providing a vehicle step system having a footplate with a foot plate top side which can be stepped on and a cleaning device having at least one air duct having at least one opening directed in the direction of the footplate top side, wherein a compressed air stream flows out of the opening when the air duct is supplied with compressed air, and wherein the footplate slides from a deployed position into a retracted position, wherein the footplate top side is supplied with compressed air during the retraction process. Advantageous further embodiments are specified in the various dependent Claims. Thereby, any and all combinations as well as only individual combinations of the vehicle step system and the cleaning process of a footplate of a vehicle step system can be used. Moreover, it is also provided and possible to combine any individual or several features of the vehicle step system and the cleaning method of a footplate of a vehicle step system.

According to the disclosure, a vehicle step system is provided which comprises a footplate having a footplate top side which can be stepped on. In addition, the vehicle step system comprises a cleaning device enabling cleaning of the footplate top side from debris. Such cleaning is realised by means of compressed air, wherein an air duct is supplied with compressed air which flows out of the air duct at an opening such that said compressed air flows in the direction of the footplate top side.

In a preferred embodiment, the opening of the air duct is arranged upstream to the footplate top side. Moreover, it is preferred that said air duct and/or the opening is arranged at the vehicle side.

Vehicle side in this context means either that the air duct and the opening are directly arranged on the vehicle or that the air duct is arranged on a door gate. A door gate in this context means vehicle side components in the entrance area of the vehicle, for example a step rail which directly or indirectly interacts with the vehicle step system and is mounted on the vehicle.

Moreover, a step plate which can be deployed and retracted may be provided. Furthermore, the latter can also be fixed whereby the air duct and the opening can be arranged on the step rail or a vehicle side faceplate, for example, or be integrated in the step rail. For example, it is also possible that an air duct having at least one opening is integrated in the bottom side of a door. Independently from this, however, other arrangements on a vehicle are possible.

In another embodiment, it is provided that the opening of the air duct but also the air duct in an interior side of the vehicle directed to the footplate top side or in another component is arranged on the vehicle side.

It is provided for the footplate top side to be cleaned with the cleaning device, such that a compressed air stream flows out of the opening of the air duct and strikes the footplate top side when the air duct is supplied with compressed air. It is thereby preferred that the air duct strikes the step plate top side directly in front of the opening, thereby, debris being subjected to force effect which pushes such debris.

Therefore, it is preferred that an outflowing air stream strikes the entire width of the footplate. With the width of the footplate in this context is meant the width of the side of the footplate directed to the vehicle.

In a first variant, the compressed air stream strikes the entire surface of the footplate. Thereby, the outflowing compressed air stream strikes the entire surface of a fixed footplate such that the latter is cleaned from debris by means of the compressed air stream. This variant is in particular used in fixed footplates. These are for example used in vehicles where a fixed board aid or a footstep is provided for individuals. Thereby, such compressed air stream must be shaped and directed such that it strikes the entire surface such that debris is pushed away.

In a second variant, the outflowing compressed air stream only covers a part of the entire surface of the footplate. For cleaning purposes of the entire surface of the footplate, however, it is then necessary that the air stream and the footplate top side realise a relative motion such that, here too, the entire surface can be cleaned from debris. For example, are known from the state of the art sliding steps, folding steps, and sliding swing steps where a footplate is deployed when individuals enter into or leave a vehicle, and then retracts. Therefore, it is preferred in the second variant to combine guidance of the compressed air stream on the footplate top side with retraction and deployment of the footplate. Therefore, it is provided in the second variant that the footplate top side is supplied over its entire width with a compressed air stream which is directed over the footplate top side when retracting the footplate into the vehicle, such that the footplate is cleaned from debris. Thereby, the compressed air stream strikes the footplate top side and removes any debris therefrom.

In one preferred embodiment, said cleaning device is arranged on the vehicle side upstream to the footplate. Moreover, said cleaning device can also be integrated in a vehicle side component, as for example a step rail, a faceplate or a door.

In another embodiment, it can be provided that an air duct is provided over the entire width of the footplate and that a compressed air stream reaches the entire width of the footplate top side. Thereby, individual openings can be introduced into the air duct such that a compressed air stream flows out therefrom in the direction of the footplate top side when being supplied with compressed air such that the compressed air cones so created overlap when striking the footplate top side such that compressed air supply is reached over the entire width of the footplate top side.

Moreover, it can also be provided that only one elongated opening is provided over the entire width of the footplate width such that the compressed air stream strikes the entire width of the footplate top side. To this effect, any and all technically useful shapes of openings may be provided in an air duct, it must only be ensured that sufficient compressed air is supplied to the footplate top side in order to push debris over the entire width of the footplate top side.

Moreover, it is also conceivable and possible that some air ducts are each provided with a unique opening from which compressed air flows out on the footplate top side. Moreover, it can also be provided that a unique air duct is provided with several openings.

It is preferred that a unique air duct comprises several openings.

In another embodiment, the air duct can be shaped as a nozzle in the vicinity of the opening.

In another embodiment, it can be provided that the opening of the air duct and the vicinity of the footplate top side where the compressed air strikes is arranged in an area inside the vehicle, for example behind a door. Such arrangement is particularly advantageous as thereby, the opening of the air duct is protected from debris due to external impact and from the outside temperature, for example from freezing.

The air duct having openings can be shaped as separate component which can be arranged upstream of the footplate top side. In this context, it is particularly preferred that the latter is shaped as an elongated component having a hollow space, wherein openings are introduced into the component enabling said compressed air to flow outside. These are then directed such that the compressed air stream flowing out through such openings strikes the footplate top side directly in front of the nozzles in order to clean the latter.

Moreover, it can also be provided that the air duct is provided with its openings as integral part of a component already arranged on the vehicle side. As already described hereinabove, an air duct and an opening may be introduced for example into a footplate, into a step rail or into a faceplate which are already arranged on the vehicle. In another embodiment, it can also be provided that an air duct and openings in such air duct are provided in the bottom side of the door.

It is particularly preferred that the distance between the place where said compressed air flows out of the opening and strikes the footplate top side is notably short as an important loss of pressure entailed by greater distances has negative effects on the way. The bigger the distance of the footplate top side from the point of outflow of said compressed air from the opening, the lesser pressure will be available on the footplate top side in order to clean the latter from debris.

In another embodiment, it can also be provided that the air duct is heated in the vicinity of the opening in order to [the verb is missing] and freezing. Moreover, it can also be provided that said compressed air is heated. A heated air stream can also improve drying efficiency of the footplate. Thereby, it can be provided that said compressed air is coupled to a heat source in the vehicle, for example a heating system already provided.

Moreover, it can be provided that a heating system is integrated in a step banding, a faceplate or the cleaning device. Thereby, it is possible that a unique heating device is provided, heating both compressed air and the air duct. Moreover, however, it can also be provided that a first heating device is provided for heating said compressed air and/or a second heating device for heating the air duct.

The pressure under which said compressed air flows out of the openings of the air duct can be controlled by a pressure controller. Compressed air systems which are provided on vehicles for passenger transport purposes usually provide compressed air compressed up to 4 bar. The latter can be used in order to also use the compressed air for the cleaning device. Thereby, said air duct may be connected to the compressed air system of a vehicle by means of a pneumatic connection. Moreover, it is also possible that the pressure which flows out of the openings in the air duct, is controlled by means of a pressure controller. Thereby, it is particularly preferred that the pressure controller is connected to the control of retraction and deployment of a sliding step such that the compressed air supply is realised during retraction of the sliding step such that the footplate top side is supplied with compressed air only when retracting such that a compressed air stream is directed onto the footplate top side which is guided over the entire surface of the footplate by retraction of said footplate. Consequently, such air stream only strikes one part over the entire width of the footplate surface, but due to the relative motion between the footplate and the air stream during retraction, the entire footplate surface will be cleaned. Therefore, this motion resembles a sweeping motion of the footplate top side by means of compressed air.

Moreover, it is also possible to use the cleaning device in order to protect the vehicle step system from penetration of water and debris, for example caused by weather or in a wash plant for rail vehicles. Thereby, said compressed air stream is used as a barrier to protect the vehicle inner space in order to avoid any penetration of water and debris or at least to reduce it.

In addition or separately to the above vehicle step system, a method for cleaning a footplate of a vehicle step system is provided. Thereby, it is provided that the vehicle step system comprises a footplate having a footplate top side and a cleaning device according to the above description. Said cleaning device comprises an air duct having at least one opening which is directed in the direction of the footplate top side.

Thereby, said air duct is supplied with compressed air and a compressed air stream flows out through the opening such that this compressed air stream strikes the footplate top side in the vicinity directly in front of the opening and that any debris located on the footplate top side in this area is pushed by the striking compressed air stream. Such pushing is entailed by the compressed air stream applying force effect onto such debris.

Therein, it is particularly preferred that the footplate is retractable and deployable and that said compressed air strikes the footplate top side during the retraction process. In this way, the footplate top side and the compressed air stream move relatively towards each other such that the area where such compressed air strikes the footplate top side is guided over the entire surface of the footplate top side. Thereby, the entire footplate top side is cleaned.

It is also particularly preferred that compressed air flows out through the openings when the footplate is retracted.

In another embodiment, the compressed air stream and/or the opening can be heated.

BRIEF DESCRIPTION OF THE DRAWINGS

Other preferred embodiments and further developments are shown in the following figures. The resulting various features however are not restricted to the various figures and embodiments. Instead, one or several features of this description may be combined with one or several features of the figures in addition to form further developments, wherein.

DETAILED DESCRIPTION OF THE DRAWINGS

Figure 1:
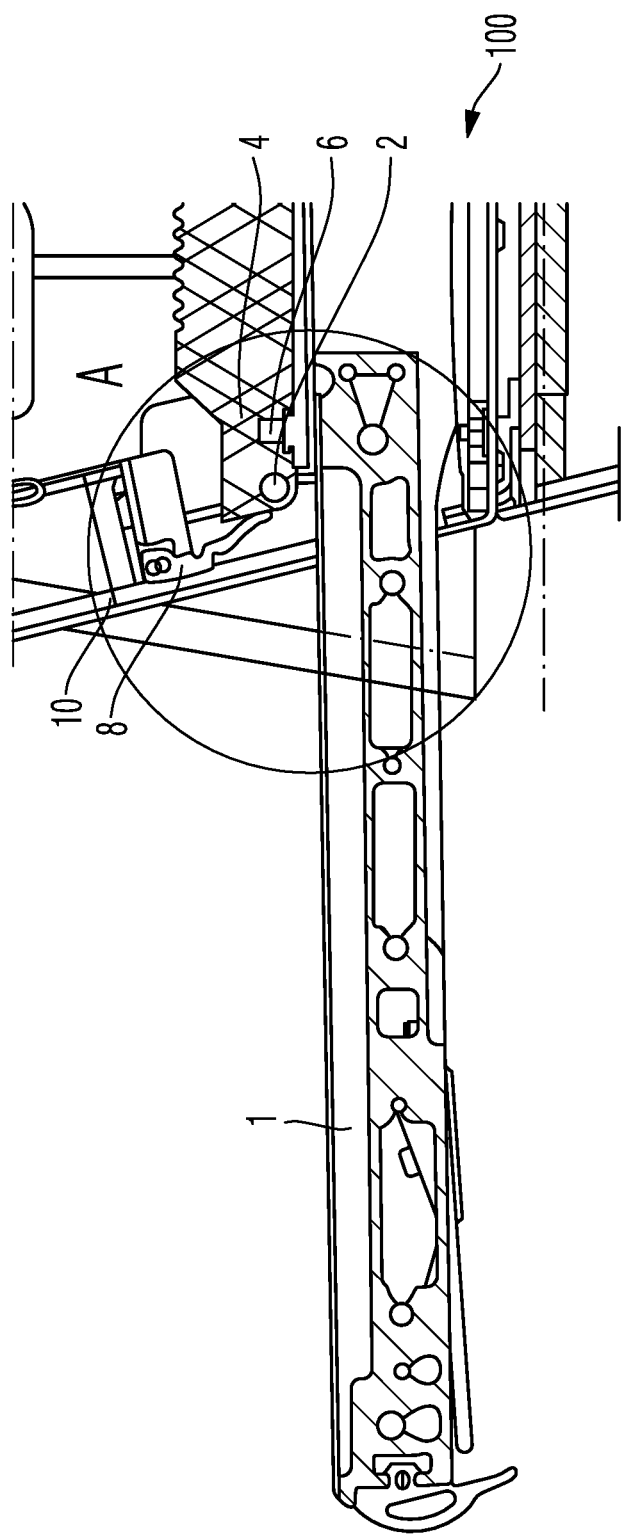
FIG. 1 is a vertical cross section of a sliding step.

FIG. 1 shows a vertical cross section of a sliding step 100 on a vehicle. Said sliding step comprises a footplate 1 which is deployed in this illustration. Thereby, one air duct 2 is integrated in a step rail 4. A door seal 8 sealing the wing of the door 10 with the step rail 4 to the outside area joins the step rail 4. The outer edge of the vehicle extends alongside the wing of the door such that the air duct 2 is arranged inside the vehicle.

Figure 2:
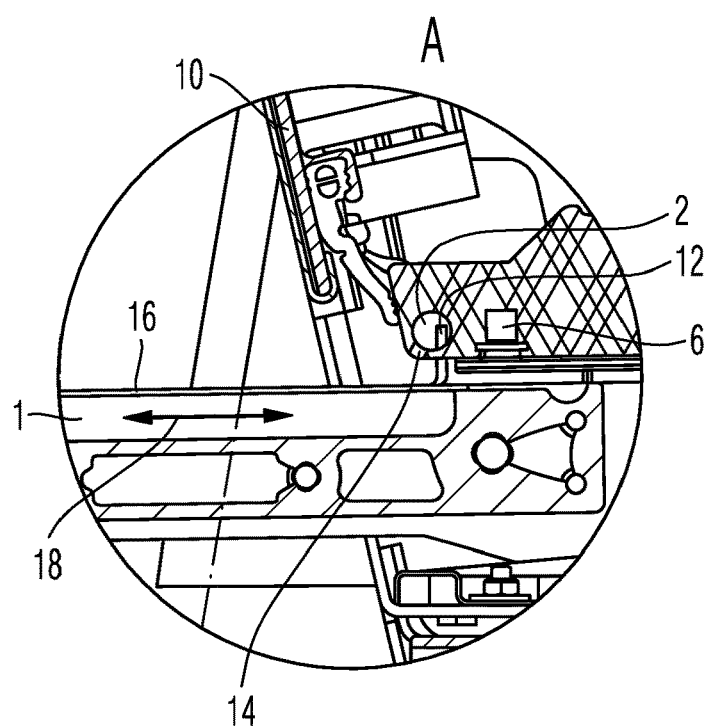
FIG. 2 and FIG. 3 are other enlargements of the vertical cross section.

Another detailed illustration A. of the vertical cross section of the sliding step 100 in the vicinity of the sealing and the air duct is shown in FIG. 2 where the air duct 2 comprises an opening 14 which is directed in the direction of the footplate top side 16. Moreover, the air duct 2 comprises a pneumatic connection 12 enabling the compressed air duct 2 to be connected to a compressed air system provided on the vehicle. The air duct 2 and the opening 14 of the air duct 2 are arranged inside the vehicle. The footplate 1 can be deployed and retracted which is illustrated by an arrow having the numeral reference 18.

Furthermore, the air duct 6 is arranged in the vicinity of the step rail heating 6 such that any freezing of the opening and/or the air duct can be avoided owing to the use of said heating 6. What is more, this can unfreeze any debris present in the form of ice and snow.

Figure 3:
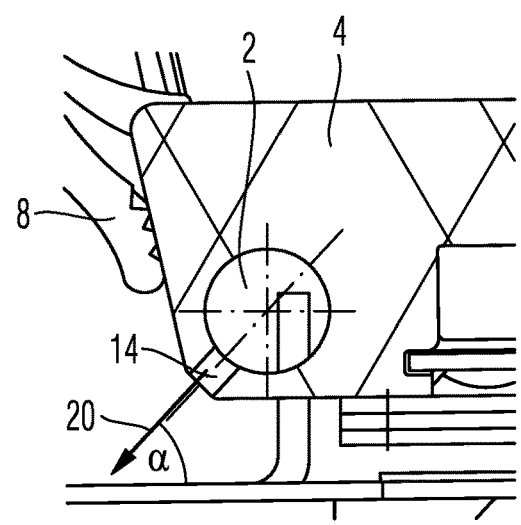

FIG. 3 illustrates the same view of the vertical cross section of the sliding step 100 in another enlargement. Here, an arrow 20 schematically illustrates how a compressed air stream flows through the opening 14 of the air duct 2 in the direction of the footplate top side 16. Thereby, the opening is directed to the footplate top side in an angle α. Said angle must range in the range from 1° to 90°. It is however particularly preferred that the compressed air stream 20 is guided onto the footplate top side in an angle between 15° and 30°. It is moreover particularly preferred that the compressed air strikes the footplate top side 16 directly in front of the opening in order for a pressure drop of the compressed air stream flowing out of the opening to be avoided to the extent possible and for the compressed air flowing out of the opening to be enabled for use for cleaning purposes of the footplate top side with a maximum force possible. The farther the place of strike of compressed air on the footplate top side from the nozzle opening, the lesser there will be any pressure available in the pressure air stream.

Figure 4:
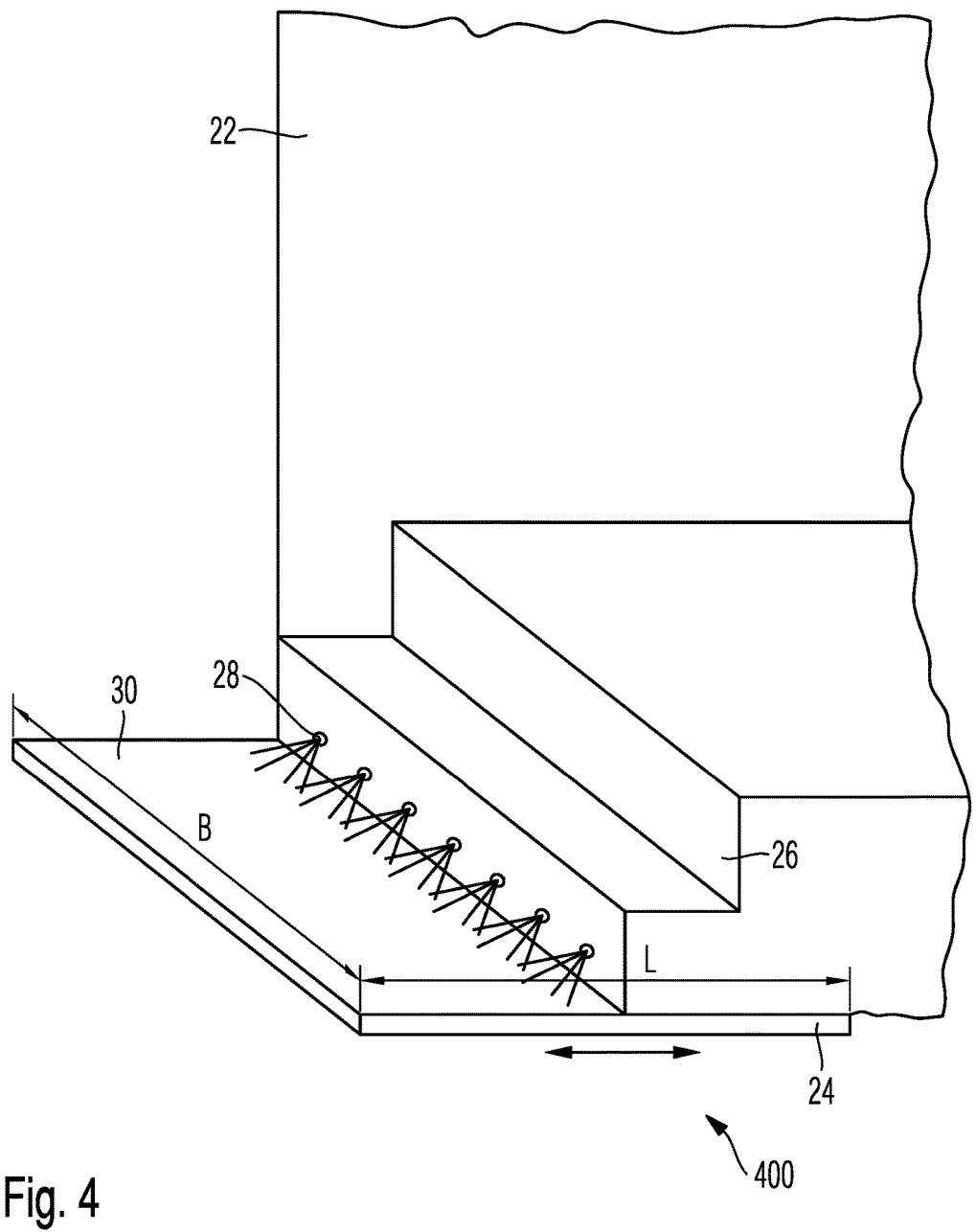
FIG. 4 another sliding step.

FIG. 4 illustrates a sliding step device 400 the footplate 24 of which can be retracted and deployed, which is schematically marked here by a double arrow. Openings 28, from which compressed air strikes the footplate top side 30, are arranged on a step tread 26 which leads into a vehicle 22. When outflowing from the openings 28 in the direction of the footplate top side 30, said compressed air forms cones which overlap, which is illustrated here schematically.

Said openings which compressed air is flowing out from are arranged in juxtaposition such that said outflowing compressed air forms cones which overlap, thereby supplying the entire width B of the footplate with compressed air. Moreover, however, it is also conceivable that the openings are shaped in an elongated form or that an elongated opening is also provided such that said compressed air is guided on the entire width B of the footplate top side 30. In order to ensure cleaning of the footplate top side even lengthwise L, said compressed air stream in operation is guided on the footplate top side during the retraction process of the footplate 24 such that said footplate top side is cleaned by the relative motion between said compressed air stream generated and the footplate top side lengthwise L because said compressed air stream is guided lengthwise over the footplate top side 30 due to retraction of the footplate 24.

Figure 5:
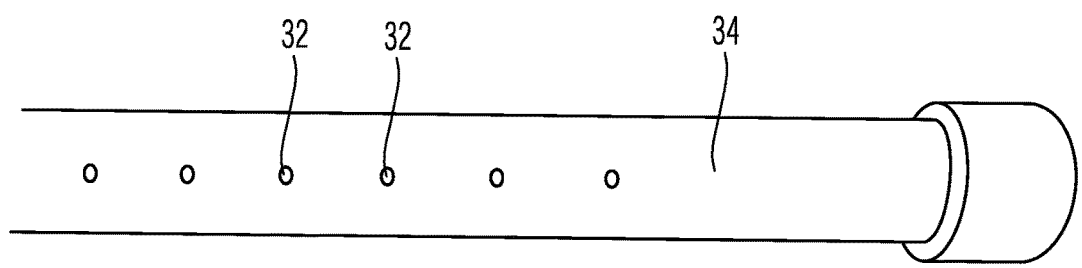
FIG. 5 a photography of a component as air duct having openings.

FIG. 5 shows an air duct 34 which is shaped in tubular form as separate component. The air duct 34 comprises a compressed air connection (not illustrated) and opening 32 which compressed air flows out from when the air duct is supplied with compressed air. The air duct can be flexibly mounted as a cleaning device on a vehicle step system.

The invention claimed is:

1. A method for cleaning a footplate of a vehicle step system, wherein the method includes the step of providing a vehicle step system having a footplate having a foot plate top side which is stepped on and a cleaning device having at least one air duct having at least one opening directed in the direction of the footplate top side, wherein a compressed air stream flows out of the opening when the air duct is supplied with compressed air, and wherein the footplate slides from a deployed position into a retracted position, wherein the footplate top side is supplied with compressed air during the retraction process.

2. The method according to claim 1, wherein the compressed air stream strikes the footplate top side directly upstream the opening.

3. The method according to claim 1, wherein the compressed air stream is heated.

4. The method according to claim 1, wherein the compressed air stream strikes the footplate top side over the entire width of the footplate.

* * * * *